US006829926B2

(12) United States Patent
Cantu et al.

(10) Patent No.: US 6,829,926 B2
(45) Date of Patent: Dec. 14, 2004

(54) SYSTEM FOR CHECKING THE AIR PRESSURE IN THE TIRES OF A MOTOR VEHICLE

(75) Inventors: Marco Cantu, Carnate (IT); Renato Caretta, Gallarate (IT)

(73) Assignee: Pirelli Pneumatici S.p.A., Milan (IT)

( * ) Notice: Subject to any disclaimer, the term of this patent is extended or adjusted under 35 U.S.C. 154(b) by 0 days.

(21) Appl. No.: 09/998,321

(22) Filed: Dec. 3, 2001

(65) Prior Publication Data

US 2002/0078741 A1 Jun. 27, 2002

Related U.S. Application Data

(63) Continuation of application No. PCT/EP00/04717, filed on May 24, 2000
(60) Provisional application No. 60/147,476, filed on Jun. 14, 1999.

(30) Foreign Application Priority Data

Jun. 2, 1999 (EP) ............................................. 99110608
Apr. 20, 2000 (EP) ............................................. 00108606

(51) Int. Cl.[7] ............................................. B60C 23/02
(52) U.S. Cl. ..................... 73/146.4; 73/146; 73/146.5
(58) Field of Search .............................. 73/146–146.8; 152/415–419

(56) References Cited

U.S. PATENT DOCUMENTS 3,662,335 A 5/1972 Fritze
4,311,985 A 1/1982 Gee et al.
5,540,092 A 7/1996 Handfield et al.
5,562,787 A 10/1996 Koch et al.
5,900,808 A 5/1999 Lebo
6,101,870 A * 8/2000 Kato et al. .................. 73/146.8

FOREIGN PATENT DOCUMENTS

EP 0 919 405 A1 6/1999
EP 0 928 680 A1 7/1999

* cited by examiner

Primary Examiner—Edward Lefkowitz
Assistant Examiner—Jermaine Jenkins
(74) Attorney, Agent, or Firm—Finnegan, Henderson, Farabow, Garrett, & Dunner, L.L.P.

(57) ABSTRACT

A system for checking at least one status parameter of a tire for a motor vehicle includes at least one wheel, including a tire mounted on a rim, an inner tube inserted into a cavity defined between the tire and the rim, a first device for measuring the at least one status parameter associated with the at least one wheel, a second device for transmitting a signal indicating a value measured by the first device, a third device for receiving the signal, and a fourth device for sensing movement of the at least one wheel and for enabling energization of the second device when the at least one wheel is moving, wherein the first, second, and fourth devices are housed in a container inserted into a wall of the inner tube in a radially-inner position of the inner tube respect to the at least one wheel.

16 Claims, 5 Drawing Sheets

SYSTEM FOR CHECKING THE AIR PRESSURE IN THE TIRES OF A MOTOR VEHICLE

CROSS-REFERENCE TO RELATED APPLICATIONS

This application is a continuation of International Patent Application No. PCT/EP00/04717, flied May 24, 2000, in the European Patent Office, the contents of which are relied upon and incorporated herein by reference; additionally, Applicants claim the right of priority under 35 U.S.C. § 119(a)–(d) based on patent application Ser. No. 99110608.9, filed Jun. 2, 1999, in the European Patent Office, and patent application No. 00108606.5, filed Apr. 20, 2000, in the European Patent Office; further, Applicants claim the benefit under 35 U.S.C. § 119(e) based on prior-filed, now abandoned provisional application No. 60/147,476 filed Jun. 14, 1999, in the U.S. Patent and Trademark Office.

The present invention relates to a system for checking the inflation pressure of the tyre, to a tyre wheel and to an inner tube comprising devices for checking the inflation pressure of the tyre.

DESCRIPTION OF THE RELATED ART

The wheel is the component providing a connection between vehicle and road; it performs the function of providing support of the pneumatic type to the vehicle and to its load and of ensuring, by means of the tyre, an adequate road-holding performance. Support of the vehicle is provided by the volume of pressurized air contained inside the wheel.

The tyre comprises an internally hollow toroidal structure formed by a plurality of components and, primarily, by a textile or metallic carcass ply having two beads each defined along an internal circumferential edge of the carcass for securing the tyre to the corresponding support rim. It also comprises at least one pair of annular reinforcing cores—usually called "bead wires"—which are circumferentially unextendable and inserted in said beads (usually at least one bead wire per bead).

The carcass ply includes a support structure which comprises textile or metal cords, axially extends from one bead to the other so as to form a toroidal structure and has its end edges each associated with a corresponding bead wire.

In tyres of the so-called radial type, the abovementioned cords lie substantially in planes containing the axis of rotation of the tyre.

On the periphery of this carcass there is arranged an annular overstructure, known as a belt structure, which is normally composed of one or more strips of rubberized fabric which are superimposed on each other so as to define a so-called "belt pack", and a tread band made of elastomer material, wound around the belt pack and moulded with a raized design for the rolling contact of the tyre on the road. Moreover, the carcass is provided, in axially opposite lateral positions, with two sidewalls which are made of elastomer material and each extends in the radial direction outwards from the external edge of the associated bead.

In tyres of the so-called tubeless type, i.e. such as not to require the use of an inner tube during operation, the inner surface of the carcass is normally lined with a so-called liner, namely one or more layers of elastomer material which are impermeable to air. Finally, the carcass may comprise other known components, i.e. edgings, fillets and fillings in accordance with the specific tyre design.

A tyre wheel for vehicles comprises a tyre defining a toroidal cavity and mounted on a corresponding rim, which has a bottom surface provided with a central well and two bead seats on which the tyre beads rest in abutment and which are each axially delimited between a radial end surface (shoulder) in an axially external position and an opposing, axially internal, annular projection for fixing the bead on the corresponding seat.

In a tyre of the tubeless type the pressurized air is contained between the tyre and the support rim. The liner layer arranged on the internal surface of the tyre is designed to keep the pressurized air inside the latter. This tyre is usually inflated by means of an inflation valve which is usually arranged on the neck of said rim.

A tyre of this type is described for example in patent application Ser. No. EP928680.

A further solution for maintaining the supporting capacity of the tyre consists in the use of an inner tube which is inserted between tyre and rim and inflated with pressurized air introduced into the inner tube by means of an inflation valve projecting outside the wheel.

The inner tube, which is inserted between tyre and rim, comprises an expandable torus-shaped tubular body which is generally made of elastomer material and is inflatable by means of an associated inflation valve.

The valve for inflating the inner tube usually comprises a base for connection to the inner tube and a cylindrical casing (stem) which is fixed to the base and which has arranged inside it the activation mechanism for the inflation and deflation operations.

A tyre which is not correctly inflated reduces the efficiency of the vehicle; it produces in particular an increase in the fuel consumption, a deterioration in the manoeuvrability characteristics, and a greater wear of the tyre, to mention only the main drawbacks.

It is therefore of the utmost importance to be able to monitor continuously the trend of the pressure in the tyres of the vehicle.

The U.S. Pat. No. 5,540,092 describes a system for monitoring the pressure in a tyre, comprising a pressure detection unit and a unit for transmitting a coded signal to the vehicle fitted with the tyre. The transmitting unit may be mounted inside or outside the tyre. The transfer of this coded signal occurs by means of inductive coupling between the transmission unit and a fixed antenna. A battery supplies power to this transmission unit.

The U.S. Pat. No. 5,900,808 describes a system for detecting low pressure in a tyre, comprising low-pressure sensor means supplied by a battery and a radiofrequency transmitter for transmitting the signal generated by these sensor means to a receiver. The system also comprises switching means designed to enable energization of the transmitter when the sensor means signal a low-pressure condition within the tyre. The life of the battery is preserved since the transmitter is energized only when it is required to transmit a signal to the receiver.

The U.S. Pat. No. 5,562,787 describes a method for monitoring the conditions of a vehicle tyre, for example the pressure and the temperature of the air inside the tyre. The method uses a programmable self-energized device which is mounted on the internal surface of the tyre or inserted in the wall of the support rim of said tyre. The device comprises a power supply source which may be activated or deactivated using a switching device, a sensor designed to monitor the abovementioned information, an integrated circuit, an amplifier and an antenna.

A transmitter-receiver, which is located on the vehicle or in a remote position, interrogates the programmable self-energized device which responds with a radiofrequency signal which contains the required information. The programmable self-energized device is activated by said remote transmitter-receiver which operates the switching device which causes the power supply source to be activated.

SUMMARY OF THE INVENTION

The Applicants have noted that, in the present art, the devices for measuring physical parameters such as, for example, pressure and temperature, of a tyre wheel and the devices for transmitting the values of said parameters are energized also during non-operative conditions, for example when the vehicle is at a standstill, or activated by means of a command which is generated outside the wheel and on which the decision to provide information on the state of said tyre wheel depends.

The Applicants have considered the problem of providing a system for monitoring the operating conditions of a tyre wheel, for example the pressure and temperature of the air inside the tyre itself, in which the detection of these conditions is performed during travel of the vehicle without the need for an activating command from outside said tyre wheel.

The Applicants have found that, by using a movement sensor arranged inside the tyre wheel and able to detect the movement of said wheel, it is possible to perform measurement only during the desired operating conditions.

In particular the movement sensor enables energization of a sensor which is arranged inside the wheel, on the rim supporting said tyre or inside the inner tube, and which measures said operating conditions.

A first aspect of the present invention relates to a system for checking at least one status parameter of a tyre for a motor vehicle comprising:

at least one tyre wheel comprising a tyre mounted on a mounting rim, a device for measuring said at least one status parameter associated with said wheel, a transmission device designed to transmit a signal indicating the value measured by said measuring device, a receiving device designed to receive said signal indicating the value measured by said measuring device, characterized in that it comprises a sensor for sensing the movement of said wheel, designed to enable energization of said transmission device when said wheel is moving. In particular, said transmission device is inserted in a bush fixed in the wall of said inner tube.

Preferably, said measuring device is inserted in said mounting rim.

Alternatively, said measuring device is associated with an inner tube inserted in said wheel. In particular, said transmission device is inserted in a wall of said inner tube in a radially internal position.

Preferably, said movement sensor is an accelerometric switch.

Preferably, said measuring device and said movement sensor are housed in the same container.

Preferably, said device for measuring at least one status parameter of a tyre is a pressure sensor.

Preferably, said device for measuring at least one status parameter of a tyre is a temperature sensor.

In particular, said transmission device comprises a power supply battery, a device for measuring the voltage of said battery and transmits the value of the measured voltage by means of a radiofrequency signal.

The system further comprises a device for displaying said signal indicating the value measured by said measuring device.

Preferably the inner tube has at least two compartments which are separate from each other and each provided with said measuring device.

A further aspect of the present invention relates to a tyre wheel for vehicles comprising:

a tyre mounted on a corresponding mounting rim, a device for measuring at least one status parameter of said tyre associated with said wheel, a transmission device designed to transmit a signal indicating the value measured by said measuring device, characterized in that it comprises a sensor for sensing the movement of said wheel, designed to enable energization of said transmission device when said wheel is moving.

Preferably, said measuring device is inserted in said mounting rim.

Alternatively, said measuring device is associated with an inner tube inserted in said wheel.

Preferably, said movement sensor is an accelerometric switch.

Preferably, said device for measuring at least one status parameter of a tyre is a pressure sensor.

Alternatively, said device for measuring at least one status parameter of a tyre is a temperature sensor.

Preferably, said transmission device, said measuring device and said movement sensor are housed in the same container.

A further aspect of the present invention relates to a sensor for measuring at least one status parameter of a tyre wheel for a motor vehicle, said wheel comprising a tyre mounted on a mounting rim, comprising:

a device for measuring at least one status parameter of said tyre, a transmission device designed to transmit a signal indicating the value measured by said measuring device, characterized in that it comprises a sensor for sensing the movement of said wheel, designed to enable energization of said transmission device when said wheel is moving.

Preferably, said sensor is inserted in said mounting rim.

Alternatively, said sensor is associated with an inner tube inserted in said wheel.

In particular, said sensor is inserted from the outside into said mounting rim.

Preferably, said transmission device, said measuring device and said movement sensor are housed in the same container.

Further characteristic features and advantages will appear more clearly from the detailed description of a preferred, but not exclusive embodiment of the different aspects of the present invention.

BRIEF DESCRIPTION OF THE DRAWINGS

This description will be provided hereinbelow with reference to the accompanying drawings, provided solely for illustrative purposes and therefore of a non-limiting nature, in which.

DETAILED DESCRIPTION OF THE PREFERRED EMBODIMENTS

Figure 1:
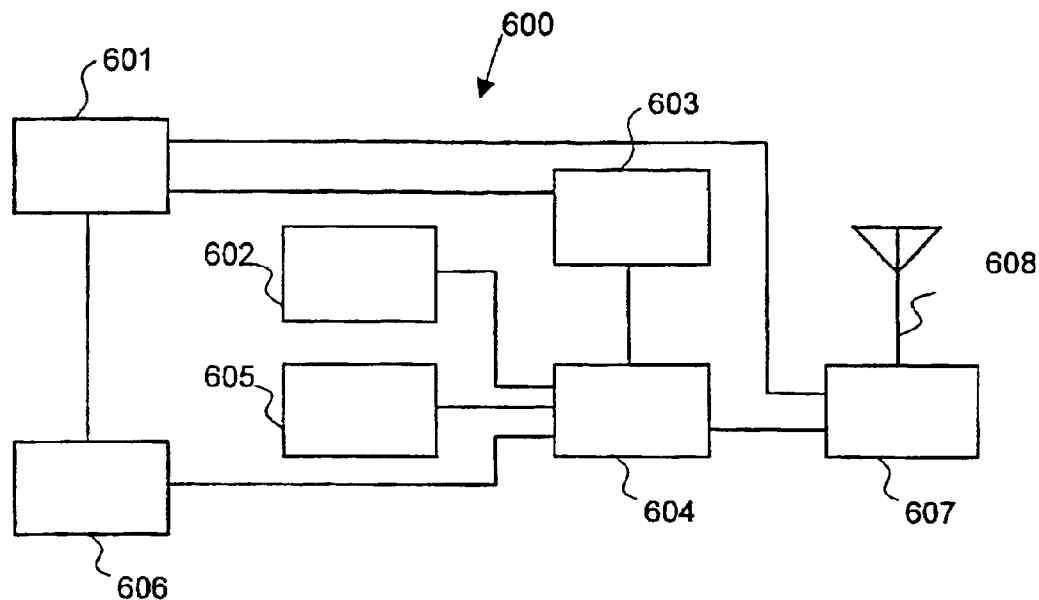
FIG. 1 shows a block diagram of the transmission section of the device for checking the air pressure.

FIG. 1 shows the block diagram of the transmitter 600 of the device for checking the air pressure in the tyres of a vehicle according to the invention. It consists of a battery-supplied electronic circuit which transmits by means of electromagnetic waves, preferably at short-wave radiofrequency, in a frequency range of between 100 kHz and 1000 MHz, even more preferably in digital form, information relating to the operating parameters of the tyre, in particular, but not exclusively relating to the inflation pressure. This transmitter 600, which is installed inside at least one tyre wheel of the motor vehicle comprises both the electronic circuit and the power supply battery. In order to keep the dimensions as small as possible, the transmitter 600 uses preferably SMD (Surface Mounting Device) technology for mounting of the components, while, in order to reduce consumption to a minimum, electronic components of the CMOS type are preferably used.

This transmitter 600 comprises a battery 601 which represents the energy source for powering the transmitter 600. It preferably consists of various lithium elements which are inserted inside a special container and connected in series; the battery 601 provides a voltage of 4.0 V and has a capacity of 150 mAh. The battery 601 is connected to a voltage regulator 603 which regulates the supply voltage supplied by the battery 601, stabilising it at 3 V. The voltage regulator 603 is preferably an integrated circuit with a low intake current and minimum input/output voltage difference, for example the integrated circuit MC78LC30 manufactured by Motorola.

The output of the voltage regulator 603 is connected to a microcontroller 604 (for example PIC16LC711 manufactured by Microchip).

The microcontroller 604 has the function of managing the transmitter 600 in accordance with a programmed logic stored inside it and described below. It receives the information from at least one pressure sensor 605, a voltage measuring device 606 and an accelerometric switch 602. The microcontroller 604 processes the information received and sends it to a transmitter circuit 607 which in turn irradiates it by means of an antenna 608.

The pressure sensor 605, which measures the inflation pressure of the tyre, is for example the sensor SM5310-060AH manufactured by Exar. It consists of a temperature-compensated pressure sensor. In order to reduce the consumption of the power supply current, the pressure sensor 605 is powered only when the microcontroller 604 requires a reading.

The voltage measuring device 606, which is connected directly to the battery 601, will be read by the microcontroller 604 whenever the charged status of the battery 601 is required.

The accelerometric switch 602, for example the model 6200-9 manufactured by Aerodyne, depending on the movement sensor, has contacts which automatically close when a predefined acceleration value is reached. When the wheel starts to move and the accelerometric switch 602 reaches the predefined acceleration value, for example of 1.5 g, it closes its contacts, thus informing the microcontroller 604 that the vehicle is moving. By way of alternative to the accelerometric switch 602 it is possible to use other movement sensor models, for example of the piezoelectric type.

The transmitter circuit 607 is a circuit which is frequency-stabilized by means of a SAW (Surface Acoustic Wave) resonator, at the frequency of 433.92 MHz. It is connected directly to the battery 601 so as to be able to have the maximum voltage available. It is able to deliver a power of about 4 mW, with ASK (Amplitude Shift Key) type modulation.

The antenna 608 is made with a short section of wire, the length of which depends on the transmission frequency; in the case of a transmission frequency of 433.92 MHz it is about 5 cm long.

Figure 2:
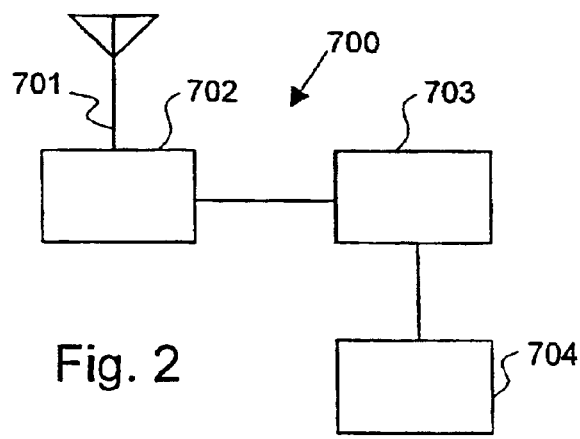
FIG. 2 shows a block diagram of the receiving section of the device for checking the air pressure.

FIG. 2 shows the block diagram of the receiving section 700 of the device for checking the air pressure of the tyres. It consists of an electronic circuit powered by the car battery. The signal is received by the antenna 701 which is connected to a receiver 702 (for example the model RXNB-CE/433 manufactured by Auriel). The received signal, suitably converted, is sent to a microcontroller 703 (for example PIC16LC711 supplied by Microchip). The microcontroller 703 drives, in accordance with the program recorded in it, a display system 704 for the information received. The display system 704 may be constructed in two versions, which can be automatically detected by the microcontroller 703 on the basis of the current consumption. A first embodiment of the display system 704 comprises a pair of LED's for each wheel, which indicate respectively, by means of a change in colour, that the tyre has a pressure lower than a value predefined beforehand and that the battery powering the transmitter 600 is becoming discharged. A different embodiment in accordance with the invention comprises a display device which indicates, in digital form, the pressure value of each tyre and the battery voltage value.

The microcontroller 703 automatically adapts itself to the display system 704 used, choosing the corresponding driving method.

The system for checking the air pressure in accordance with programs stored in the microcontrollers 604 and 703 operates in the manner described below.

When the motor vehicle starts to move and the centrifugal force reaches 1.5 g, which corresponds to about 8 km/h, the transmitter 600 is energized, the microcontroller 604 reads the value of the pressure sensor 605 and/or the voltage value of the battery 601 and transmits the information, for example, 14 times in succession. At this point, in order to save the battery power, the microcontroller 604 assumes a completely inactive state for a first predefined period of time (for example 2.3 s); during this period only the memories and a timing oscillator (inside the microcontroller 604) remain functional. At the end of this first period, it checks whether a second predefined period of time (an interval which defines the time between successive sensor reading operations), for example 3 minutes, has lapsed; if it has not lapsed, it assumes again the inactive state for a period of time for example equal to the preceding time; if it has lapsed, it reads the pressure sensor again. In the case where a third predefined period of time (interval between successive transmissions), for example 21 minutes from the last transmission, has lapsed, or in the case where a pressure difference between the last measurements performed which is greater than a predefined threshold is detected, it performs a new transmission (preferably 14 times in succession) of the correlated information.

In order to prevent the transmissions of the various transmitters 600 from overlapping with each other, they are staggered temporally. In particular, the plurality of transmitters 600 installed on a motor vehicle has an identification number. Each identification number has, associated with it, a predefined delay time which is proportional thereto. The transmission of the signal takes place at the previously defined transmission time (21 minutes or when a malfunction occurs) plus the previously defined delay time. In this way the transmissions are staggered temporally with each other and do not overlap, avoiding the possible loss of information.

When the motor vehicle stops and the accelerometric switch 602 opens its contacts, the microcontroller 604 ensures that the circuits of the transmitter 600 are energized and remain in operation for a further predefined period of time, for example between 30 minutes and 2 hours, following which they are switched to a completely inactive state until the motor vehicle starts to move again. In this way, it is possible to distinguish between temporary stoppages of the vehicle (for example, stoppages at traffic lights or in queues of traffic), where the system must remain operational, and prolonged stoppages (for example in car parks), where the system may be switched off. On account of distortion of the signal due to reflection of the radio signal or drops in the carrier caused by rotation of the wheel and therefore a continuous change in the position of the antenna (different polarization of the two transmission and receiving antennas) or interference of an electromagnetic origin, the signal may reach the receiver 702 in a distorted or incomplete form. Measures have therefore been introduced in order to limit to a minimum any incorrect interpretation of the signal received.

The information is transmitted by the transmitter 600 for example by means of an ASK type modulation, via successive sequences of bits where the total number of bits of a sequence is equal to 26, and comprises a start bit with a duration equal to 120% of the bit period.

Each transmission performed by each transmitter 600 is repeated a predefined number of times, for example 14 times in succession.

The microcontroller 703, by means of a logic recorded in the memory, for example by verifying the duration of the period of the single bit and its half-cycle, analyses the first sequence of bits received and, only if all the bits which form it are within a predefined tolerance, is the entire transmission accepted. Should one or more bits be outside of the tolerance range, the sequence of bits will not be accepted entirely, but only the value and the position of those bits received correctly will be accepted and stored. Receiving the same signal 14 times in succession, the system will be able to reconstruct the entire sequence, adding into the memory the bits missing initially, but received subsequently, during the whole sequence of fourteen transmissions. When the tyres, and therefore the associated devices for checking the air pressure (transmitters 600 and receiver 700) are mounted on a motor vehicle for the first time, initialization thereof is performed automatically. The tyres, once they start to move, transmit the information as described above. The microcontroller 703 stores the identification code of the transmitters—and therefore the wheels present on the motor vehicle. The microcontroller 703 is programmed so as to compare this identification code with that of the successive transmissions and accept only the code received several times in succession, discarding the incorrect identification codes (different from those stored during initialization) for example transmitted by another motor vehicle which has the same pressure control system and is present in the vicinity. This function is always active so as to prevent the transmission of any transmitters not belonging to the motor vehicle entering into the control system of the vehicle itself. Moreover, as a result it is not necessary to perform any manual initialization of the air pressure checking devices in the event of replacement of one or more tyres and/or the transmitters.

Figure 3:
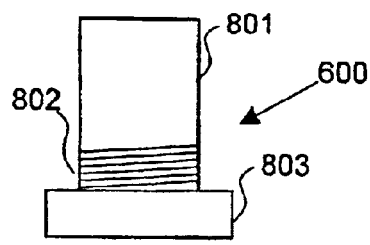
FIG. 3 shows an embodiment of the transmission section of the device for checking the air pressure.

The transmitter 600, including the batteries, is preferably formed and contained in a cylindrical shaped container 801, as shown in FIG. 3. It has a thread 802 (for example M 16, pitch 0.75) so as to be able to be fastened to a threaded bush 21, and a flange 803 which comes into abutment with the bush 21. The measurements of this container 801 without the flange 803 are 14.75 mm for the external diameter and 30 mm for the length, for an overall weight of about 10 grams.

The threading 802 allows rapid replacement of the transmitter 600 in the event of maintenance thereof. Moreover, mounting of the transmitter 600 may be performed at the time of assembly of the inner-tube in the tyre, thus avoiding possible damage during movement of the inner tubes.

Figure 4:
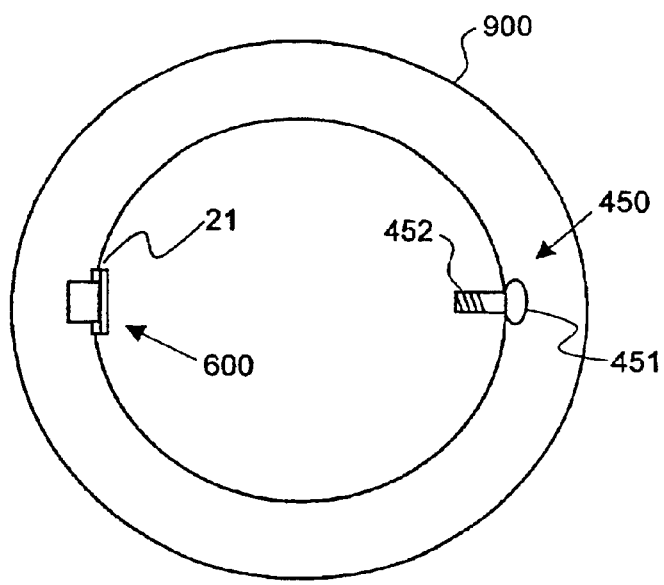
FIG. 4 shows a cross-section of an inner tube of a tyre according to an embodiment of the present invention.

FIG. 4 shows a cross-section through an inner tube 900 of a tyre according to a preferred embodiment of the present invention. It shows a transmitter 600 mounted on a threaded bush 21 and an inflation valve 450 of the traditional type. The inflation valve 450 comprises a base 451 which has, inside it, the activation mechanism for the inflating and deflating operations, and a cylindrical casing 452 (stem) fixed to the base 451.

The stem 452 of the valve is usually housed in a special hole provided on the bottom surface of the rim and more precisely on the wall of the well, from which it protrudes into the external environment, at atmospheric pressure, with the corresponding end closed by a cap.

The transmitter 600 for checking the air pressure of tyres of a motor vehicle is mounted on said conventional inner tube preferably in a diametral position (at 180°) with respect to the inflation valve 450 so that the weights are distributed in a balanced manner such that the tyre is not unbalanced during rotation.

Preferably, the transmitter 600 is located in the radially internal wall part (on the intrados surface) of the inner tube 400 so as to face towards the central well of the rim onto which the inner tube and the tyre will be mounted. In this way there is sufficient space to contain the projecting part of the transmitter 600 and the bush 21; moreover, they do not come into contact with the radially internal surface of the tyre, avoiding possible damage both to the tyre (abrasions) and to the transmitter 600.

Figure 5:
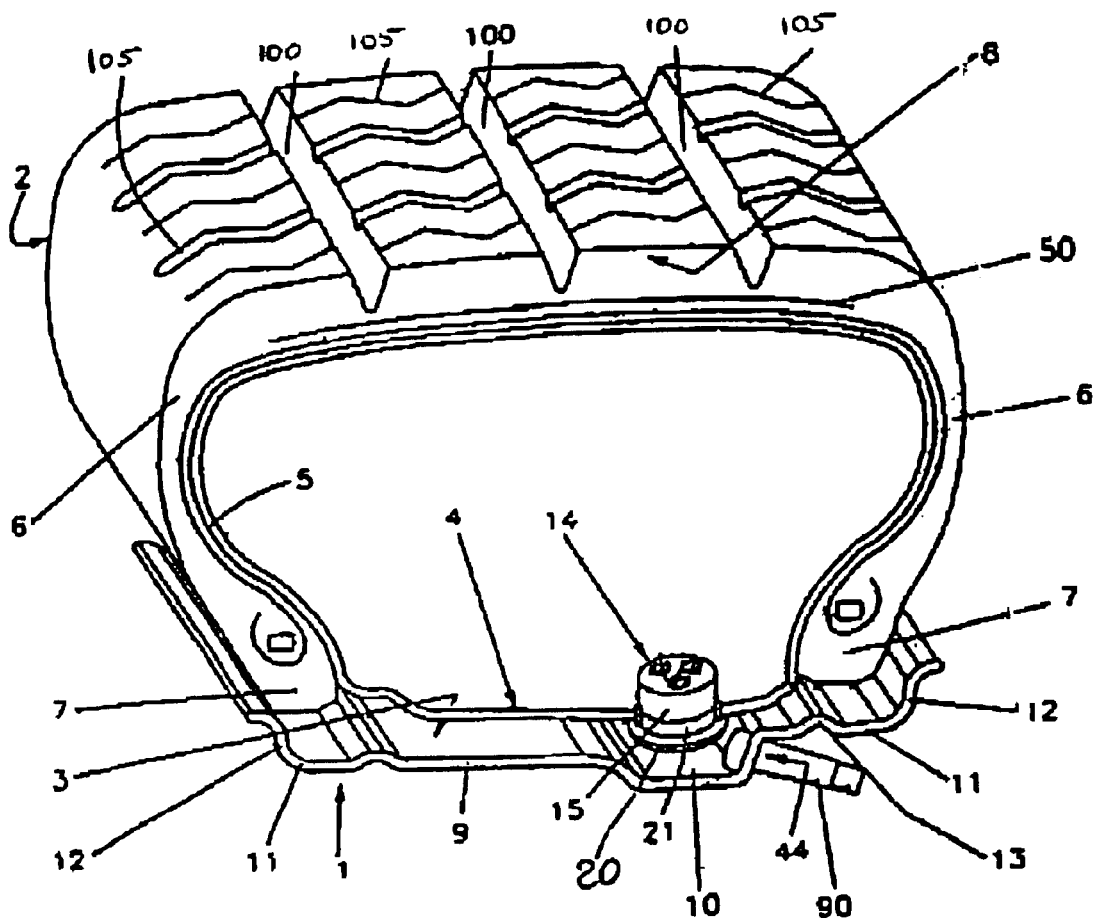
FIG. 5 shows a partial axial cross-section of a tyre mounted on the respective rim comprising an inner tube.

In FIG. 5, 1 denotes in a partial cross-sectional view a wheel for vehicles comprising a tyre 2, a rim 3 and an inner tube 4 inserted into the cavity defined between tyre and rim.

The tyre 2 comprises a toroidal carcass 5, sidewalls 6 terminating in a pair of beads 7, a tread band 8 provided on its radially external surface with a suitable tread pattern including recesses 100 and sipes 105 and, if necessary, a belt structure 50 arranged, on the periphery of the tyre, between carcass and tread band, this structure usually comprising a plurality of rubberized fabric strips which are radially superimposed and reinforced with textile or metal cords which are parallel to each other in each strip and intersecting with respect to the adjacent strips and preferably arranged parallel to the equatorial plane in the radially outermost strip.

The rim 3 comprises a bottom surface 9 provided with a central well 10 and two bead seats 11 which are lateral with respect to the well and against which the beads of the tyre rest in abutment; each seat is defined axially between a radial end surface (shoulder) 12 in an axially external position and an annular axially internal projection 13.

A hole 44, inside which a common inflation valve 90 for tubeless tyres is mounted, is advantageously formed in the wall of the well 10.

The inner tube 4 is preferably moulded and vulcanized in a toroidal shape so as to memorize this shape, in other words, when subjected to mechanical stresses that deform it, the inner tube is able to produce elastic reaction designed to ensure that it reacquires the original underformed shape. In particular, and more preferably the, inner tube is moulded and vulcanized with a toroidal shape having an internal volume not less than one third of the final volume of use.

It is particularly advantageous, for tyres with a "low profile", to use an inner tube (FIG. 6) which is preferably divided into two circumferential compartments A and B which are separated by a central wall 110 of greater rigidity than the sidewalls 115, such as that described in European Patent Application EP919405 filed by the same Applicants.

This inner tube is divided into at least two separate circumferential parts, separated by a longitudinal wall, providing said wall, and preferably also the zone surrounding it, with a greater rigidity than the more axially external part, i.e. the sidewalls of the inner tube, so that, during inflation of the tube inside the tyre, the expansion of the tube in the axial direction is greater than in the radial direction so as to bring its central portion into contact with the zone of the tread at the same time as completely adapting the sides to the sidewalls of the tyre, thus avoiding the generation of abnormal tensions in the walls of the tube.

This inner tube may be preferably obtained by forming the sides of the inner tubes separately from the central part thereof, then joining together the separate parts, advantageously by means of chemical adhesion of the associated elastomeric materials during vulcanization of the inner tube.

Obviously the inner tube may be formed in any other convenient manner and may be of any type, both single-volume and with a number of compartments greater than two, however arranged.

For the purposes of inflation and deflation of the compartments into which the inner tube is divided, each compartment will be provided with an associated device 14 (FIG. 5) which does not have any parts for connection to the external environment, which pass through the rim.

This device 14 is advantageous during conditions of rapid acceleration of the vehicle, where there is the possibility that the tyre may slip with respect to the rim with the consequent high risk of tearing of the inner tube at the base of the valve or shearing of the valve stem, with consequent immediate deflation of the tyre and corresponding loss of stability of the vehicle, thereby seriously endangering the lives of the driver and the passengers of the vehicle itself.

The device 14 for inflating, deflating and calibrating the inner tube comprises a rigid body 15 which is preferably made of plastic material or light metal alloys. The rigid body 15, which has a preferably cylindrical configuration, is mounted inside a special threaded bush 21 (FIG. 6) defining a circular through-opening formed in the elastomer material of the radially internal (intrados) surface of the inner tube.

Preferably, the abovementioned rigid body 15 (external diameter 14.75 mm and length 30 mm) comprises an annular portion of its threaded external surface (for example thread M 16, pitch 0.75), so as to allow it to be screwed into the bush 21, and a base flange 20 which allows its position to be fixed with respect to the bush. The rigid body 15 has an overall weight of about 10 grams.

Figure 6:
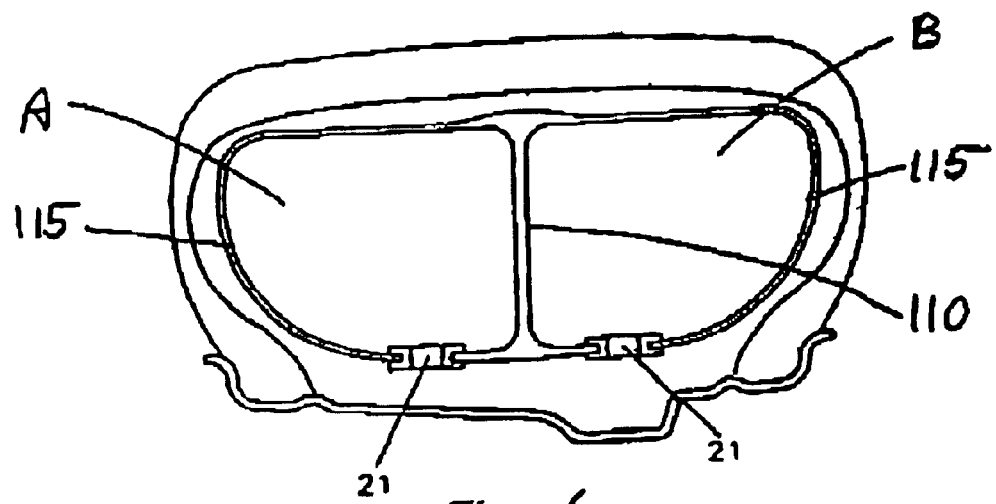
FIG. 6 shows an embodiment of an inner tube according to the invention.

As can be clearly understood from FIGS. 5 and 6, the abovementioned rigid body 15 is completely devoid of any parts for connection to the environment outside the wheel. Moreover, the inner tube provided with this device is free to move into any position inside the cavity defined by the tyre and the wall of the rim.

In particular, inflation of the inner tube is performed by introducing air under pressure into the space between tyre and rim, so as to deform the tube with respect to its initial configuration, thus creating a pressure difference between the internal volume of the tube and the external space, pending therefore restoration of the equilibrium between the pressures in the abovementioned environments, corresponding to the return of the tube into its original undeformed configuration. Subsequently the air present outside the tube is allowed to flow into the surrounding atmosphere, thus allowing expansion of the tube itself until it fills entirely the cavity between tyre and rim.

Then, the correct and predefined value of air pressure inside the chamber is reached by releasing the air creating an overpressure with respect to the desired value, by means of a device which is suitably calibrated to said value.

The valve, which does not have any parts for connection to the external environment, may also comprise one or more independent (inlet, calibration and discharge) elements which are separate from one another, and may also not have some of said elements.

Figure 7:
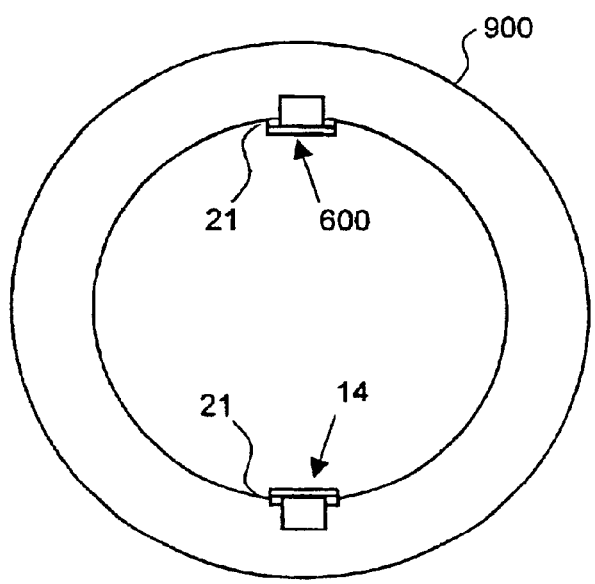
FIG. 7 shows a cross-section of an inner tube of a tyre according to a different embodiment of the present invention.

FIG. 7 shows a cross-section through an inner tube 900 of a tyre according to an embodiment of the present invention, in which it is possible to note a transmitter 600 which is mounted on a first threaded bush 21 and a device 14 for inflation, deflation and calibration of the inner tube, which is mounted on a second threaded bush 21 which is preferably located in a diametrically opposite position (at about 180°) from the former for a balanced distribution of the weights.

Preferably, the device 14 and the transmitter 600 are positioned towards the inside of the inner tube 900 so that, when mounted on the respective rim, they face the central well of the rim itself. In this way there is sufficient space for housing these devices.

Figure 8:
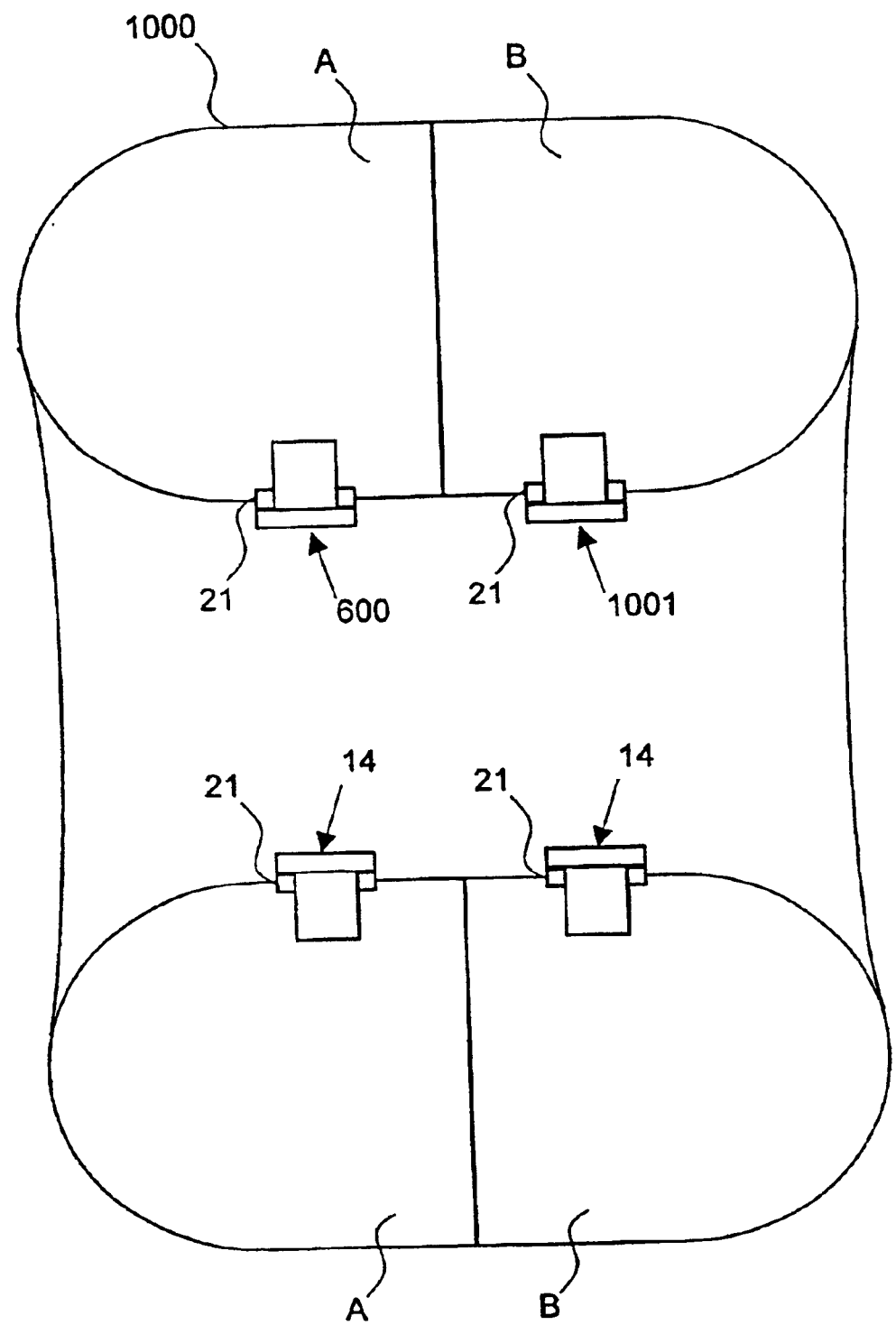
FIG. 8 shows a cross-section of an inner tube of a tyre according to a further embodiment of the present invention.

FIG. 8 shows a cross-section through an inner tube 1000, which is divided into two circumferential compartments A and B, in accordance with a further embodiment of the present invention. A transmitter 600 is mounted on a first threaded bush 21 of the compartment A and an inflation device 14 is mounted on a second threaded bush 21 of the compartment A located at 180° from the former so as to balance the weights.

For an inner tube 1000, which is divided into two circumferential compartments A and B, two inflation devices 14 are necessary, namely one for each compartment. A single transmitter 600, on the other hand, is sufficient to provide a warning as to variations in pressure of the two compartments of the inner tube.

In the case where only one transmitter 600 is used, it is preferable to use a balancing device 1001 to balance the weights of the inner tube 1000. In this case an inflation device 14 is mounted on a first threaded bush 21 of the compartment B and a balancing device 1001 is mounted on a second threaded bush 21 of the compartment B located at 180° from the first one so as to balance the weights.

The balancing device 1001 preferably consists of a container of the same type as the container 801 and preferably having the same weight as the other elements mounted on the inner tube, with the aim of balancing and distributing uniformly the weights of the inner tube and hence the tyre.

A greater degree of sensitivity may be obtained with two transmitters 600, i.e. one for each compartment.

Figure 9:
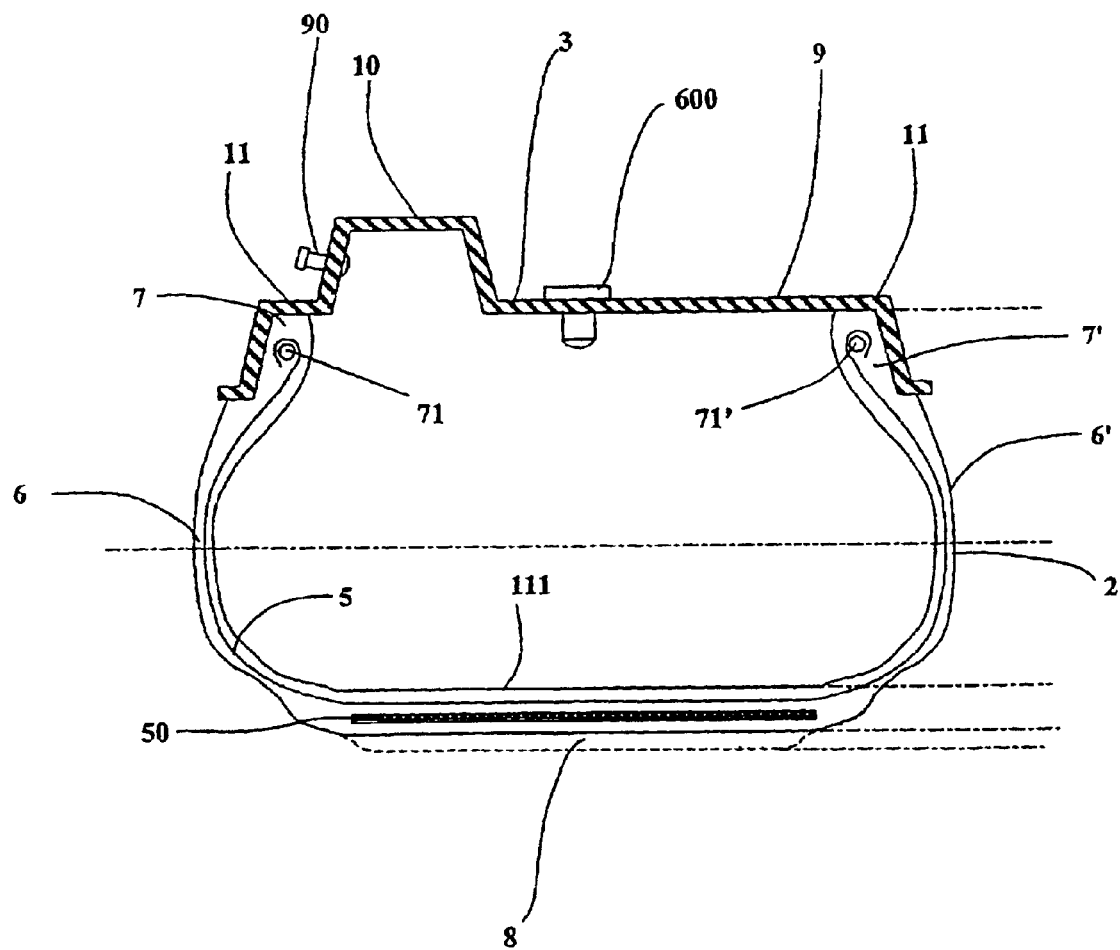
FIG. 9 shows a cross-section of a tubeless tyre according to a further embodiment of the present invention.

FIG. 9 shows, by way of example, a wheel comprising a tyre 2, of the type conventionally known as a tubeless tyre, and a support rim 3. This tyre 2 is inflated by means of an inflation valve 90 which is arranged for example, in a manner known per se, on the neck 10 of said rim.

The rim 3 comprises a bottom surface 9 provided with a central well 10 and two bead seats 11 which are located on the sides of the well and on which the tyre beads rest in abutment; each seat is delimited axially between a radial end surface (shoulder) 12 in an axially external position and an axially internal annular projection 13.

The tyre 2 consists of an internally hollow toroidal structure formed by a plurality of components and, primarily, by a textile or metallic carcass ply 5 having two beads 7 and 7' each defined along an internal circumferential edge of the carcass for securing the tyre to the corresponding support rim 3. It also comprises at least one pair of annular reinforcing cores—usually called bead wires 71 and 71'—which are circumferentially unextendable and inserted in said beads (usually at least one bead wire per bead).

The carcass ply includes a support structure which comprises textile or metal cords, axially extends from one bead to the other so as to form a toroidal structure and has its end edges each associated with a corresponding bead wire.

In tyres of the so-called radial type, the abovementioned cords lie substantially in planes containing the axis of rotation of the tyre.

On the periphery of this carcass there is arranged an annular overstructure, known as a belt structure 50, and a tread band 8. The belt structure is normally composed of one or more strips of rubberized fabric that are superimposed on each other so as to define a so-called "belt pack." The tread band 8 is made of elastomer material wound around the belt pack and moulded with a design for rolling contact of the tyre on the road. Moreover, the carcass is provided, in axially opposite lateral positions, with two sidewalls 6 and 6' that are made of elastomer material. Each sidewall extends in the radial direction outwards from the external edge of the associated bead.

In tyres of the so-called tubeless type, i.e. such as not to require the use of an inner tube during operation, the inner surface of the carcass is normally lined with a so-called liner 111, namely one or more layers of elastomer material which are impermeable to air. Finally, the carcass may comprise other known elements, i.e. edgings, fillets and fillings in accordance with the specific tyre design.

The transmitter 600 of the type described above, mounted on a threaded bush, is inserted in the support rim 3. This threaded bush is formed preferably along the equatorial plane of the tyre on said bottom surface 9 of the rim 3.

In these tubeless tyres, the transmitter/sensor is inserted from the outside of the rim by screwing the transmitter itself into said threaded bush. This allows rapid and easy assembly and disassembly of the transmitter should maintenance or replacement operations be required. Moreover, the transmitter inserted in the support rim allows application of the system for checking the air pressure to tyres of the traditional type for which no structural modification is required.

Moreover, the pressure sensor may be supplemented and/or replaced by a sensor of a different type designed to measure at least one status parameter of said tyre wheel. The status parameters of a tyre wheel are parameters relating to the physical conditions of the wheel, for example the air pressure or the temperature of said pressurized air inside the wheel.

What is claimed is:

1. System for checking at least one status parameter of a tyre for a motor vehicle, comprising:
    at least one tyre wheel comprising a tyre mounted on a mounting rim;
    an inner tube inserted into a cavity defined between the tyre and the rim;
    a first device for measuring the at least one status parameter associated with the at least one wheel;
    a second device for transmitting a signal indicating a value measured by the first device, wherein the second device comprises a battery;
    a third device for receiving the signal; and
    a forth device for sensing movement of the at least one wheel and for enabling energization of the second device, when the at least one wheel is moving;
    wherein the first device, the second device, and the forth device are housed in a container inserted into a wall of the inner tube in a radially-inner position of the inner tube with respect to the at least one wheel.

2. The system of claim 1, wherein the fourth device is an acceleration switch.

3. The system of claim 1, wherein the container is inserted into a bushing fixed in the wall of the inner tube.

4. The system of claim 1, wherein the first device comprises a pressure sensor.

5. The system of claim 1, wherein the first device comprises a temperature sensor.

6. The system of claim 1, wherein the second device further comprises a fifth device for measuring a voltage of the power supply battery, and wherein the second device transmits a value of the measured voltage using a radio-frequency signal.

7. The system of claim 1, further comprising a sixth device for displaying the signal.

8. The system of claim 1, wherein the inner tube comprises at least two compartments separate from each other and each provided with a first device.

9. A wheel for vehicles, comprising:
    a tyre mounted on a rim;
    an inner tube inserted into a cavity defined between the tyre and the rim;
    a first device for measuring the at least one status parameter associated with the wheel;
    a second device for transmitting a signal indicating a value measured by the first device, wherein the second device comprises a battery; and
    a third device for sensing movement of the wheel and for enabling energization of the second device, when the wheel is moving;
    wherein the first device, the second device, and the third device are housed in a container inserted into a wall of the inner tube in a radially-inner position of the inner tube with respect to the wheel.

10. The wheel of claim 9, wherein the third device is an acceleration switch.

11. The wheel of claim 9, wherein the first device comprises a pressure sensor.

12. The wheel of claim 9, wherein the first device comprises a temperature senior.

13. A wheel for vehicles, comprising:

a tyre mounted on a rim;

a first device for measuring the at least one status parameter associated with the wheel;

a second device for transmitting a signal indicating a value measured by the first device, wherein the second device comprises a battery;

a third device for sensing movement of the wheel designed to connect the battery to the second device when the wheel is moving; second device, when the wheel is moving;

wherein the first device, the second device, and the third device are housed in a container, and wherein the container is inserted into the rim from an outside of the rim by screwing the container into a threaded bushing.

14. The wheel of claim 13, wherein the third device is an acceleration switch.

15. The wheel of claim 13, wherein the first device comprise a pressure sensor.

16. The wheel of claim 13, wherein the first device comprises a temperature sensor.

* * * * *

UNITED STATES PATENT AND TRADEMARK OFFICE
CERTIFICATE OF CORRECTION

PATENT NO. : 6,829,926 B2
DATED : December 14, 2004
INVENTOR(S) : Marco Cantu et al.

It is certified that error appears in the above-identified patent and that said Letters Patent is hereby corrected as shown below:

Column 12,
Line 14, "System" should read -- A system --.
Line 14, "one tyre wheel" should read -- one wheel --.
Line 17, delete "mounting".
Line 26, "forth" should read -- fourth --.
Line 28, "device, when" should read -- device when --.
Line 29, "forth" should read -- fourth --.
Line 43, "power supply" should read -- power-supply --.
Line 56, "measuring the at" should read -- measuring at --.
Lines 56-57, "parameter associated" should read -- parameter of the tyre associated --.
Line 62, "device, when" should read -- device when --.

Column 13,
Line 6, "senior." should read -- sensor. --.
Line 9, "measuring the at" should read -- measuring at --.
Lines 9-10, "parameter associated" should read -- parameter of the tyre associated --.
Line 14, "wheel" should read -- wheel, --.

Column 14,
Lines 1-2, delete "second device, when the wheel is moving;".
Line 12, "comprise" should read -- comprises --.

Signed and Sealed this

Nineteenth Day of July, 2005

JON W. DUDAS
*Director of the United States Patent and Trademark Office*